United States Patent [19]

Eaton, III et al.

[11] Patent Number: 5,474,161

[45] Date of Patent: Dec. 12, 1995

[54] ROTOR FOR A DISC BRAKE ASSEMBLY AND METHOD OF MAKING SAME

[75] Inventors: Elton R. Eaton, III, Birmingham; Judy L. Simmons; George F. Stringfellow, both of Dearborn Heights, all of Mich.

[73] Assignee: Ford Motor Company, Dearborn, Mich.

[21] Appl. No.: 377,067

[22] Filed: Jan. 23, 1995

[51] Int. Cl.$^6$ .................................................. F16D 65/12
[52] U.S. Cl. ............................ 188/264 A; 188/218 XL
[58] Field of Search ........................... 188/18 A, 218 XL, 188/251 M, 264 A, 264 AA; 192/70.12, 107 R, 113.2, 113.22, 113.23, 113.26, 113.3, 113.36; 29/557, 558, 894.325

[56] References Cited

U.S. PATENT DOCUMENTS

| | | |
|---|---|---|
| 1,860,375 | 12/1930 | Winterer et al. . |
| 2,180,086 | 12/1936 | Kraft ..................................... 192/107 R |
| 2,856,050 | 10/1958 | Mathews ............................ 192/113.36 |
| 3,301,356 | 2/1965 | Pompa . |
| 3,603,435 | 9/1971 | Buzzard et al. . |
| 3,759,066 | 9/1973 | Portnoy ................................. 192/107 R |
| 4,156,479 | 5/1979 | Kawamura . |
| 4,811,822 | 3/1989 | Estaque . |
| 5,137,123 | 8/1992 | Setogawa et al. . |

FOREIGN PATENT DOCUMENTS

| | | |
|---|---|---|
| 534916 | 12/1956 | Canada ................................. 192/107 R |
| 1535705 | 4/1967 | France . |
| 2308256 | 9/1974 | Germany . |
| 204974 | 12/1983 | Germany . |
| 54-5173 | 1/1979 | Japan . |
| 941751 | 7/1982 | U.S.S.R. . |
| 787579 | 12/1957 | United Kingdom . |

*Primary Examiner*—David M. Mitchell
*Assistant Examiner*—Chris Schwartz
*Attorney, Agent, or Firm*—Joseph W. Malleck; Roger L. May

[57] ABSTRACT

A rotor for a disc brake assembly includes a centrally disposed hub and at least one friction surface disposed annularly about the hub, the friction surface including a single continuous spiral groove disposed between the hub and an outer radial edge of the rotor, the single continuous spiral groove including a first portion wherein the groove is disposed radially side-by-side relative to itself and concentrically about the hub with each adjacent segment of the first portion of the groove being spaced from itself by a first predetermined distance, the single continuous spiral groove also including a second portion wherein the groove is disposed radially in side-by-side relation relative to itself and concentrically about the hub with each adjacent segment of the second portion of the groove being spaced from itself by a second predetermined distance which is different from the first predetermined distance to improve braking of the rotor.

8 Claims, 2 Drawing Sheets

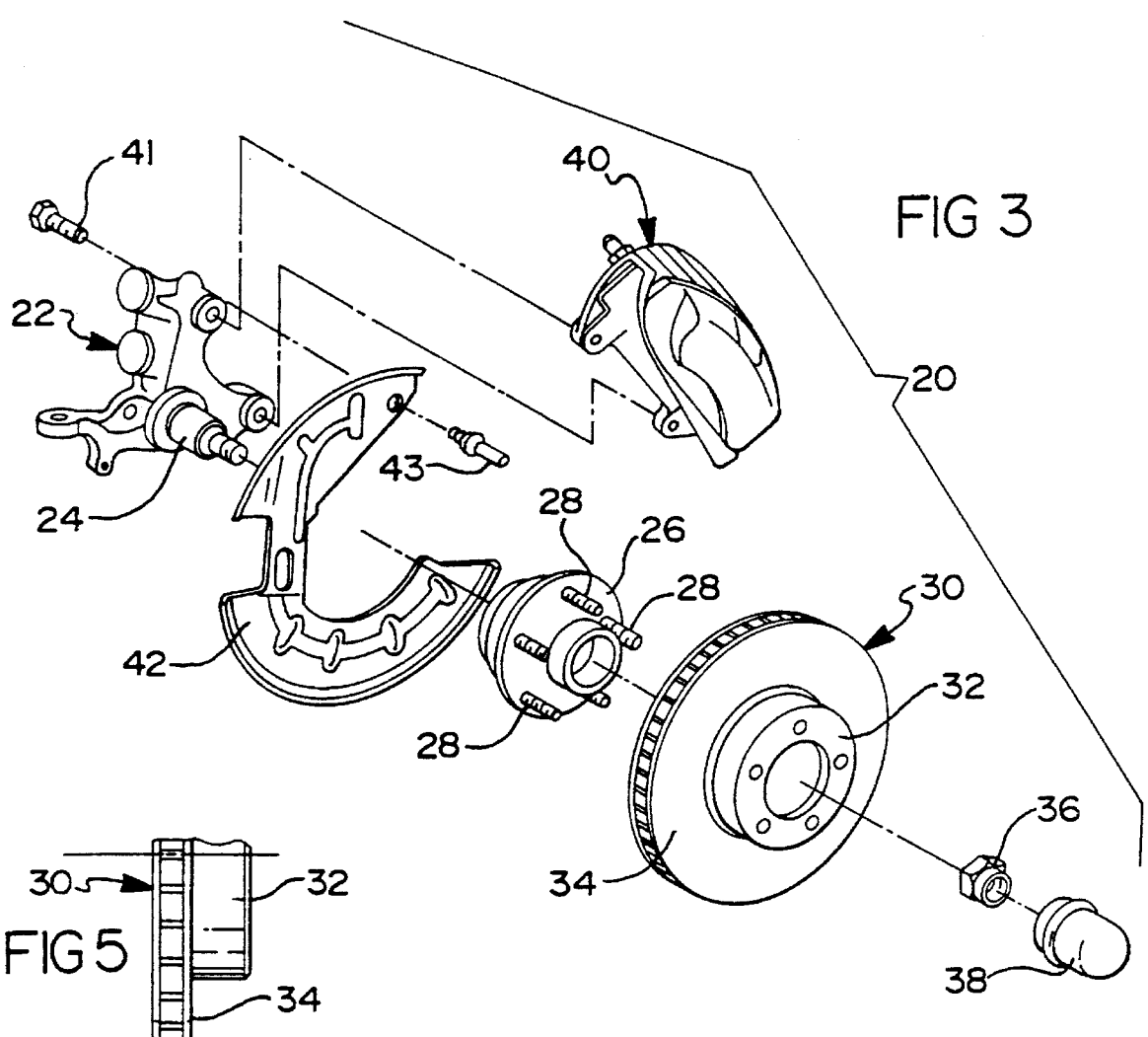
FIG 3
FIG 5
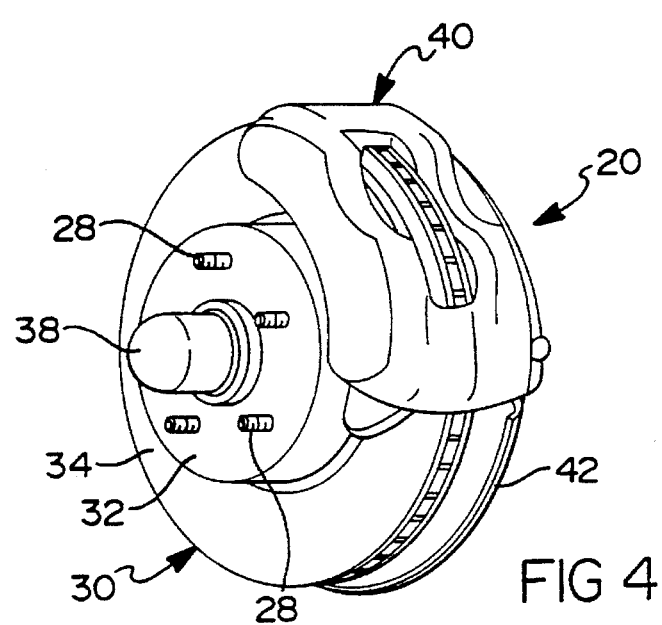
FIG 4

ROTOR FOR A DISC BRAKE ASSEMBLY AND METHOD OF MAKING SAME

BACKGROUND OF THE INVENTION

1. Field Of the Invention

The present invention relates generally to disc brake assemblies for vehicles and, more specifically, to a rotor for a disc brake assembly for use in vehicles as well as a method for making same.

2. Description Of the Related Art

It is known to commonly employ brakes such as disc brakes in vehicles such as automotive vehicles for slowing and stopping the vehicle. Generally, a disc brake assembly includes a disc brake rotor mounted on a wheel hub which rotates with a wheel and a disc brake caliper which is fixedly mounted by fasteners on a wheel spindle of the vehicle. The caliper includes one or more brake shoes or pads movably mounted thereto and adapted to apply braking pressure to one or both sides of the rotor, thereby braking the wheel along which it rotates.

Preferably, the rotors are machined such that the thickness of the rotor is constant throughout its cross section. For example, and as shown in a plan view of a portion of a prior art rotor 10 in FIG. 1, such rotors 10 typically include grooves 12 cut into one or both surfaces of the rotor 10. More specifically, and as known in the art, a single continuous groove 12 is typically spirally cut on a braking or friction surface of the rotor 10 such that the groove 12 appears as a series of grooves cut concentrically about a hub 14 of the rotor 10 and spaced radially equally relative to each other.

One disadvantage of the above prior art rotor when used in a disc brake assembly is that sometimes an unacceptable clack, thump or click type noise (hereinafter referred to as "clack" or "clacking") may occur with the application of the disc brakes. Clack may occur when the brake pad is applied against the friction surface of the rotor 10. The brake pad moves along or follows the path of the groove 12 and, when it reaches the end or stops, the brake pad pops up and slides radially back to repeat itself.

Attempts have been made in the prior art to eliminate "clack". For example, opposed spiral grooves have been employed on opposite sides of the rotor. That is to say, on one side of the rotor, the groove 12 has been cut by a cutting tool moving at a constant feed rate from a point near the hub 14 of the rotor 10 and spiraled outwardly to a radial edge 16 of the rotor 10. On the opposite side, the groove 12 has been similarly cut but beginning from the radial edge 16 of the rotor 10 and moving at a constant feed rate toward the hub 14. The radial spacing of the adjacent grooves 12 in side-by-side relation was essentially equal or constant. However, even after such steps were taken, clacking was not totally eliminated.

Further, an attempt to employ an interrupted groove rather than a continuous groove on one or both sides of the rotor was also found to be unsatisfactory. The interrupted groove was formed by a cutting tool moving at a constant feed rate with a pause at various intervals. The interrupted groove unacceptably increased the cost of manufacturing the rotor and resulted in a shorter useful life of the cutting tool.

SUMMARY OF THE INVENTION

Accordingly, the present invention is a rotor for a disc brake assembly including a centrally disposed hub and at least one friction surface disposed annularly about the hub. The friction surface includes a single continuous spiral groove disposed between the hub and an outer radial edge of the rotor. The single continuous spiral groove includes a first portion wherein the groove is disposed radially in side-by-side relation relative to itself and concentrically about the hub with each adjacent segment of the first portion of the groove spaced from itself by a first predetermined distance. The single continuous spiral groove also includes a second portion wherein the groove is disposed radially in side-by-side relation relative to itself and concentrically about the hub with each adjacent segment of the second portion of the groove spaced from itself by a second predetermined distance which is different from the first predetermined distance to improve braking of the rotor.

Additionally, the present invention is a method of making a rotor for a disc brake assembly including the steps of cutting a single continuous spiral groove by moving a cutting tool across the friction surface at a first predetermined rate and forming a first portion of the groove and by moving the cutting tool across the friction surface at a second predetermined rate which is different from the first predetermined rate and forming a second portion of the groove.

One advantage of the present invention is that a rotor is provided for a disc brake assembly. Another advantage of the present invention is that the rotor prevents clacking because the brake pads are not forced to follow the continuous spiral groove. Yet another advantage of the present invention is that the rotor has first and second portions of the continuous spiral groove which cause competing forces to act upon the brake pad which eliminates clacking. Still another advantage of the present invention is that a method is provided of making the rotor which uses a multiple feed rate pattern on the friction or braking surface of the rotor. A further advantage of the present invention is that the rotor solves these problems in an efficient, cost effective manner.

Other features and advantages of the present invention will be readily appreciated as the same becomes better understood after reading the subsequent description when considered in connection with the accompanying drawings.

BRIEF DESCRIPTION OF THE DRAWINGS

FIG. 3 is an exploded view of a disc brake assembly which incorporates the rotor of FIG. 2.

FIG. 4 is a perspective view of the disc brake assembly of FIG. 3 as assembled with a portion broken away.

FIG. 5 is a partial side view of the rotor of FIG. 2 illustrating a pair of cutting tools employed for cutting spiral grooves on the rotor.

DESCRIPTION OF THE PREFERRED EMBODIMENT(S)

Figure 1:
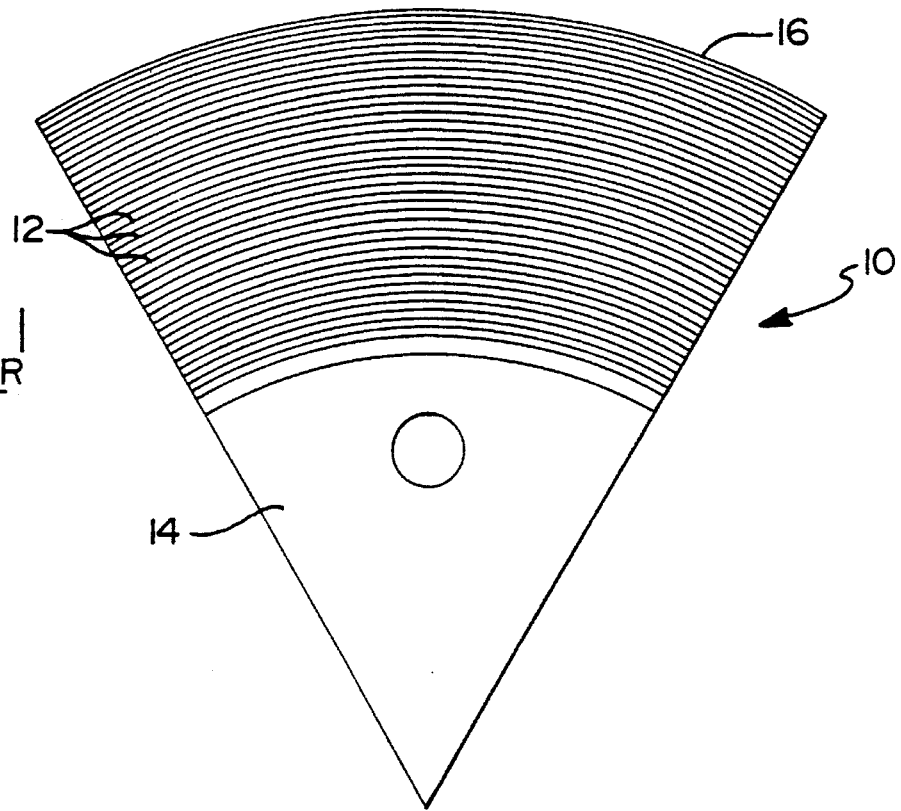
FIG. 1 is a plan view of a portion of a prior art rotor.

Referring now to the drawings, and in particular to FIGS. 3 and 4, one embodiment of a disc brake assembly 20 is shown for a vehicle such as an automotive vehicle (not shown). The disc brake assembly 20 is mounted to a wheel spindle, generally indicated at 22, which is connected to a suspension system (not shown) of the automotive vehicle. The wheel spindle 22 includes a short stub axle 24 on which a wheel hub 26 is rotatably mounted. The wheel hub 26 includes a plurality of threaded studs 28 circumferentially spaced from one another and radially disposed about the wheel hub 26. An automotive wheel assembly (not shown) of the automotive vehicle is operatively coupled to the wheel hub 26 for rotational movement relative to the spindle 22 to support the automotive vehicle for rolling engagement with a support surface, such as a road.

The disc brake assembly 20 includes a disc brake rotor, generally indicated at 30 and according to the present invention, mounted on the wheel hub 26 via the threaded studs 28 and secured thereto by fasteners such that it rotates therewith. The rotor 30 defines a disc or annulus having a centrally disposed rotor hub 32 and a pair of friction or braking surfaces 34 disposed annularly about the rotor hub 32 and generally parallel relative to each other on opposite sides of the rotor 30. Further, the disc brake assembly 20 typically includes a wheel hub retainer 36 as well as a hub cap grease seal 38 mounted on the wheel hub 26.

The disc brake assembly 20 also includes a brake caliper, generally indicated at 40, operatively and fixedly mounted by fasteners 41 to the spindle 22 and associated with the rotor 30 for engaging the friction surfaces 34 to brake the rotor 30. More specifically, the caliper 40 includes brake shoes or pads (not shown) movably mounted on the caliper 40 for applying braking pressure to the friction surfaces 34. As illustrated in FIG. 4, the caliper 40 straddles the rotor 30 such that the brake pads squeeze the rotor 30 to sandwich the rotor 30 therebetween as is commonly known in the art. The disc brake assembly 20 also includes a rotor shield 42 mounted by rivets 43 to the spindle 22 and employed to limit the amount of dirt and other foreign particles which become collected on the disc brake assembly 20.

Figure 2:
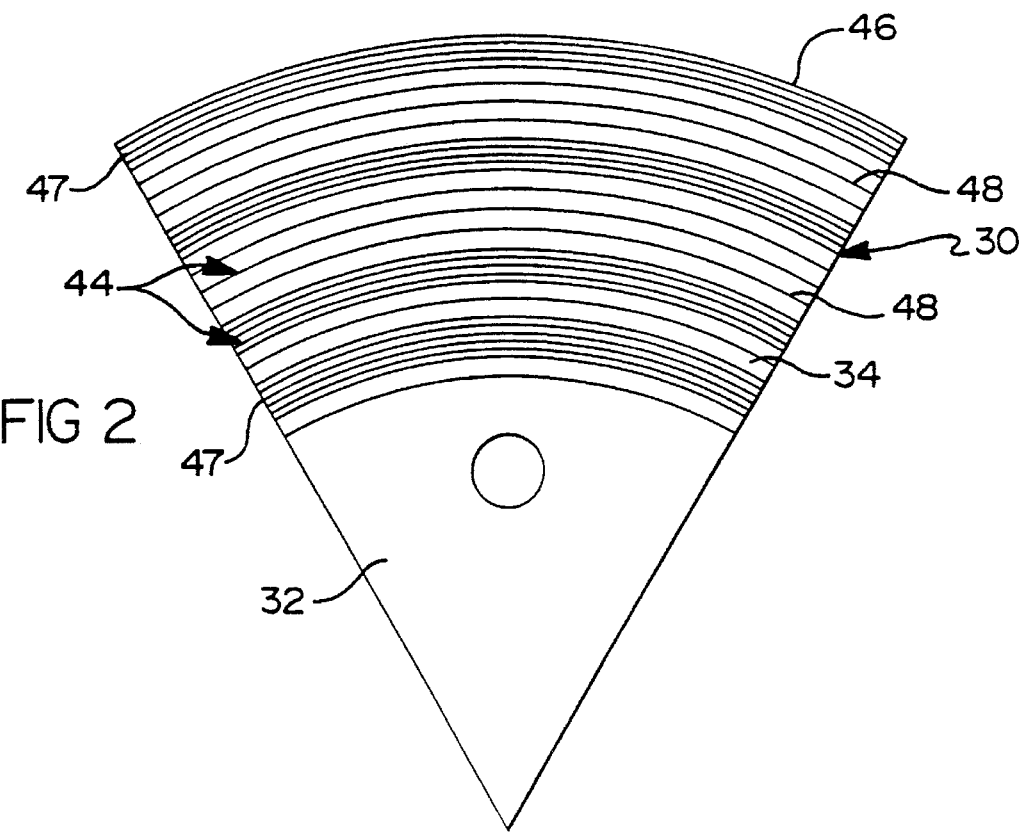
FIG. 2 is a plan view of a portion of a rotor, according to the present invention, for a disc brake assembly.

Referring now to FIG. 2 in conjunction with FIGS. 3 and 4, the friction surfaces 34 of the rotor 30 include a single, continuous, spiral groove, generally indicated at 44, disposed between the rotor hub 32 and the outer radial edge 46 of the rotor 30. The single, continuous, spiral groove 44 includes a first portion 47 wherein the groove 44 is disposed radially in side-by-side relation relative to itself and concentrically about the hub 32. Each adjacent segment of the groove 44 for the first portion 47 is spaced radially by a first predetermined distance. The single, continuous, spiral groove 44 also includes at least a second portion 48 wherein the groove 44 is disposed radially in side-by-side relation relative to itself and concentrically about the hub 32. Each adjacent segment of the groove 44 for the second portion 48 is spaced radially by a second predetermined distance. The second predetermined distance is different from the first predetermined distance. Moreover, the first portion 47 and second portion 48 of the groove 44 are alternated from each other.

In the embodiment shown in FIG. 2, the second predetermined distance is greater than the first predetermined distance. For example, the first portion 47 has a radial distance of 0.25 inches on the friction surfaces with adjacent grooves spaced from each other at a rate of 130 grooves or turns per inch and the second portion 48 has a radial distance of 0.5 inches on the friction surfaces 34 with adjacent grooves spaced from each other at a rate of 110 grooves or turns per inch. It should be appreciated that the first predetermined distance could be greater than the second predetermined distance. It should also be appreciated that the single, continuous spiral groove 44 in the friction surface 34 could include more than two portions, each spaced from the other by a different predetermined distance to form a non-continuous pattern on the friction surface 34.

Accordingly, a method of making the rotor 30, according to the present invention, for the disc brake assembly 20 includes the steps of defining or forming a disc having the centrally disposed hub 32 and at least one friction surface 34 disposed annularly about the hub 32. As illustrated in FIG. 5, two friction surfaces 34 for the rotor 30 are shown and a pair of cutting tools 50 are employed to cut the spiral groove 44 as discussed below. However, it should be understood that the spiral groove 44 could be cut into only one friction surface 34. More specifically, each cutting tool 50 cuts the single, continuous, spiral groove 44 located between the hub 32 and the outer radial edge 36 on each of the friction surfaces 34 of the rotor 30 such that each spiral groove 44 includes the first portion 47 as described above by moving the cutting tool 50 across the friction surface 34 at a first predetermined feed rate. The cutting tool 50 also forms at least one second portion 48 of the groove 44 as described above by moving the cutting tool 50 across the friction surface 34 at a second predetermined feed rate which is different from the first predetermined feed rate.

More specifically, the spiral groove 44 is cut on the friction surfaces 34 with the aid of a CNC machine as is known in the art. Over the span of any given first portion 47 of the spiral groove 44, the groove 44 may be cut at a feed rate of 130 turns per inch. On the other hand, in the preferred embodiment, the groove 44 may be cut in the second portion 48 at a feed rate of 110 turns per inch. Preferably, the feed rate of the cutting tool 50 across the friction surface 34 alternates between the first and second predetermined feed rates to produce the first and second portions 47 and 48, respectively of the groove 44. It should be appreciated that the cutting tool 50 may be moved across the friction surface 34 at more than just two predetermined feed rates and may include multiple feed rates to provide multiple portions wherein adjacent segments of the continuous, spiral groove 44 are spaced by more than the first and second predetermined distances discussed above to form a non-continuous pattern on the friction surfaces 34.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A rotor for a disc brake assembly comprising:

a centrally disposed hub and at least one friction surface disposed about said hub;

said friction surface including a single continuous spiral groove disposed between said hub and an outer radial edge of said rotor, said single continuous spiral groove including a first portion wherein said groove has adjacent segments thereof disposed radially in side-by-side relation relative to itself and concentrically about said hub with each adjacent segment of said first portion of said groove being spaced from itself by a first predetermined distance, said single continuous spiral groove also including at least a second portion wherein said groove has adjacent segments thereof disposed radially in side-by-side relation relative to itself and concentrically about said hub with each adjacent segment of said second portion of said groove being spaced from itself by a second predetermined distance which is different from said first predetermined distance to improve braking of said rotor.

2. A rotor as set forth in claim 1 wherein said first and second portions of said groove are spaced from each other.

3. A disc brake assembly for an automotive vehicle comprising;

a rotor which defines a disc having a centrally disposed hub and a plurality of friction surfaces disposed about said hub and generally parallel relative to each other on opposite sides of said rotor;

a caliper operatively associated with said rotor for engaging said friction surfaces of said rotor;

each of said friction surfaces including a single continuous spiral groove disposed between said hub and an outer radial edge of said rotor, said single continuous spiral groove including a first portion wherein said groove has adjacent segments thereof disposed radially in side-by-side relation relative to itself and concentrically about said hub with each adjacent segment of said first portion of said groove being spaced from itself by a first predetermined distance, said single continuous spiral groove also including a second portion wherein said groove has adjacent segments thereof disposed in side-by-side relation relative to itself and concentrically about said hub with each adjacent segment of said second portion of said groove being spaced from itself by a second predetermined distance which is different from said first predetermined distance to improve braking of said rotor.

4. A disc brake assembly as set forth in claim 3 wherein said first and second portions of said groove are spaced from each other.

5. A disc brake assembly as set forth in claim 3 wherein said first and second portions of said groove are alternated across said friction surfaces.

6. A method of making a rotor for a disc brake assembly including the steps of:

forming a rotor including a centrally disposed hub and at least one friction surface disposed about the hub; and cutting a single continuous spiral groove by moving a cutting tool across the friction surface at a first predetermined feed rate and forming a first portion of the groove wherein the groove has adjacent segments thereof disposed radially in side-by-side relation relative to itself and concentrically about the hub with each adjacent segment of the first portion of the groove being spaced from itself by a first predetermined distance and by moving the cutting tool across the friction surface at least at a second predetermined feed rate which is different from the first predetermined feed rate to form a second portion of the groove wherein the groove has adjacent segments thereof disposed radially in side-by-side relation relative to itself and concentrically about the hub with each adjacent segment of the second portion of said groove being spaced from itself by a second predetermined distance which is different from the first predetermined distance.

7. A method as set forth in claim 6 including the step of alternating the first predetermined feed rate and second predetermined feed rate.

8. A method as set forth in claim 6 wherein said step of cutting includes cutting the single continuous spiral groove between the hub and an outer radial edge of the rotor.

* * * * *